US006217069B1

(12) United States Patent
Ganesan

(10) Patent No.: US 6,217,069 B1
(45) Date of Patent: Apr. 17, 2001

(54) SAFETY RESTRAINT FOR A HORIZONTAL PASSENGER

(76) Inventor: Palvannanathan Ganesan, 4903 Chicago St., No. 8, Omaha, NE (US) 68132

( * ) Notice: Subject to any disclaimer, the term of this patent is extended or adjusted under 35 U.S.C. 154(b) by 0 days.

(21) Appl. No.: 09/289,856

(22) Filed: Apr. 12, 1999

(51) Int. Cl.[7] .................................................. B60R 22/00
(52) U.S. Cl. ........................ 280/801.1; 5/424; 297/483
(58) Field of Search ............................. 280/801.1, 801.2, 280/748, 749; 297/468, 483, 486; 296/190.02; 5/118, 424; 128/875, 876

(56) References Cited

U.S. PATENT DOCUMENTS

| D. 312,992 | 12/1990 | Liebman | D12/128 |
|---|---|---|---|
| D. 332,930 | 2/1993 | Clark et al. | D12/128 |
| 2,633,906 | 4/1953 | Franz | 155/189 |
| 3,385,633 | 5/1968 | Aizley | 297/389 |
| 3,529,864 | 9/1970 | Rose et al. | 297/387 |
| 4,064,574 | * 12/1977 | Schnitzler | 5/627 |
| 4,205,670 | 6/1980 | Owens | 128/134 |
| 4,218,074 | * 8/1980 | Crawford | 280/801.1 |
| 4,709,966 | 12/1987 | Parkinson et al. | 297/473 |
| 4,750,478 | 6/1988 | Bergeron | 128/70 |
| 4,770,459 | * 9/1988 | Nakaiwa et al. | 296/68.1 |
| 5,131,682 | 7/1992 | Reed | 280/801 |
| 5,211,186 | 5/1993 | Shoemaker et al. | 128/870 |
| 5,226,698 | 7/1993 | Harrison | 297/485 |
| 5,233,156 | 8/1993 | Chan et al. | 219/121.52 |
| 5,375,879 | 12/1994 | Williams et al. | 280/749 |
| 5,536,042 | * 7/1996 | Williams et al. | 280/749 |
| 5,727,814 | * 3/1998 | White | 280/748 |
| 6,042,190 | * 3/2000 | Mathe et al. | 297/483 |

FOREIGN PATENT DOCUMENTS

614788 * 9/1994 (EP).

* cited by examiner

Primary Examiner—J. J. Swann
Assistant Examiner—David R. Dunn
(74) Attorney, Agent, or Firm—Zarley, McKee, Thomte, Voorhees & Sease; Dennis L. Thomte

(57) ABSTRACT

The present device provides a plurality of belts to restrain a horizontal passenger within a vehicle. In its preferred embodiment, a diagonal belt is secured to the vehicle proximal the side of the sleeping surface near the hips of the passenger. Where the passenger is lying on his back, the diagonal belt extends toward the shoulder of the passenger and is in contact with the back of the passenger. It is looped over the shoulder and passes over the chest of the passenger. It is then secured to the vehicle proximal the hips of the passenger. The passenger may lie on his side or chest, as well. The restraint also includes two belts positioned transverse to the sleeping surface. The transverse belts may wrap around the sleeping surface; may be secured proximal one side of the sleeping surface and secured proximal the opposite side of the sleeping surface, extending over the sleeping surface; or may be positioned entirely above the sleeping surface. The first transverse belt extends over the chest and under the arms of the passenger; the second transverse belt extends over the thighs of the passenger. The safety restraint comfortably protects a horizontal passenger from forces that may be applied from any direction.

17 Claims, 13 Drawing Sheets

SAFETY RESTRAINT FOR A HORIZONTAL PASSENGER

BACKGROUND OF THE INVENTION

The present apparatus relates generally to a safety belt configuration for use in vehicles by passengers who are lying down.

Many vehicles are equipped with safety belts for restraining passengers within the vehicle during abrupt changes in velocity, such as collisions. Most vehicles are designed to carry passengers in a seated position with safety belts designed to restrain passengers in the seated position. Passengers that wish to lie on such seats much forego the safety of a safety belt. Several prior art attempts have been made to overcome this shortcoming in design. Several products are currently on the market which allow infants to sleep in a substantially semi-reclined fashion but are not designed to allow the infant to lie flat or to lie on his/her side. These products are not suitable for use by older children or adults because the child is displaced perpendicular to the length of the seat. In order to have room to lie down comfortably, adults and children must lie down along the length of the seat.

One attempt to provide a safety belt for a horizontal passenger in a vehicle is disclosed in U.S. Pat. No. 5,131,682 issued to R. Reed on Jul. 21, 1992, for a seat belt apparatus for sleepers. That patent discloses a single belt, similar to a lap belt, which is positioned transverse to the length of a bench-style seat, with the belt being designed to be worn around the midsection of the user. Also, beds in semi-tractors have been equipped with two safety belts arranged transverse to the sleeping surface which extend over the entire sleeping surface.

These arrangements have several shortcomings. First, the prior art restraints offer little or no protection against forces applied in a direction parallel to the longitudinal axis of the sleeping individual. Secondly, the prior art restraints have no mechanism which retains the belt or belts in a stationary position relative to the body of a sleeping passenger, allowing the restraints to migrate to vulnerable areas of the passenger's body, such as the neck, or to slip off the passenger entirely.

SUMMARY OF THE INVENTION

The present device provides a plurality of belts for restraining a horizontal passenger within a vehicle. In the preferred embodiment, a diagonal belt is secured to the vehicle proximal the side of the sleeping surface near the hips of the passenger. Where the passenger is lying on his/her back, the diagonal belt extends toward the shoulder of the passenger while in contact with the back of the passenger, is looped over the shoulder, passes over the passenger's chest, and is then secured to the vehicle proximal the hips of the passenger. The diagonal belt is secured to the same side of its origin in a "Kuta" style belt or to the opposite side of its origin in a "Chena"style belt.

The restraint of this invention also includes two belts positioned transverse to the sleeping surface. The first transverse belt extends over the chest and under the arms of the passenger; the second transverse belt extends over the thighs of the passenger. When used with a sleeping surface having an accessible underside, as are found in many passenger vans, the transverse belts wrap around the sleeping surface. When used with a sleeping surface having an inaccessible underside, as are found in automobile back seats and semi-tractor beds, the transverse belts are secured proximal one side of the sleeping surface and secured proximal the opposite side of the sleeping surface. When used with a sleeping surface having a proximal padded wall, such as the back rest of a seat of a car, the diagonal belt and the transverse belts may be mounted on one side of the sleeping surface and positioned entirely above the sleeping surface. As shown hereinafter, the safety restraint comfortably protects a horizontal passenger from forces that may be applied from any direction.

Accordingly, one object of the invention is to provide a device which can be used by a horizontal passenger as a safety restraint.

Another object of the invention is to maintain the relationship of the belts to the body of the passenger while the passenger is sleeping.

Yet another object of the invention is to provide a safety restraint which offers protection from impact from any direction.

Another object of the invention is to provide a safety restraint which is comfortable and operational for a passenger lying on his back, side, or chest.

Another object of the invention is to provide a device which serves as a safety restraint for a horizontal passenger, but does not expose the passenger to extensive soft tissue damage.

Another object of the invention is to provide a safety restraint which is operational in a number of different settings.

These and other objects will be apparent to those skilled in the art.

DESCRIPTION OF THE PREFERRED EMBODIMENT

Figure 1:
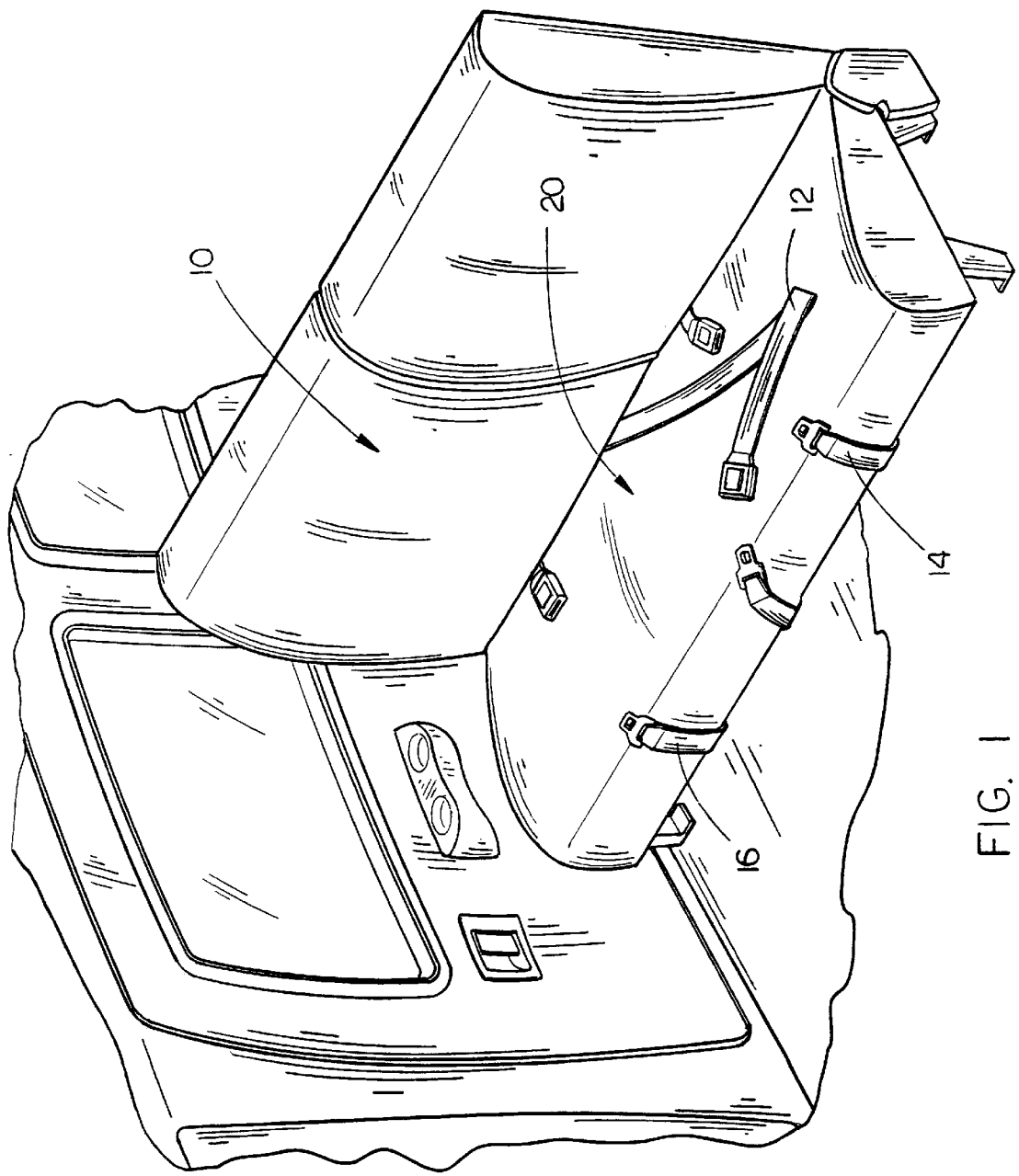
FIG. 1 is a perspective view of the safety restraint in a passenger vehicle.
Figure 4:
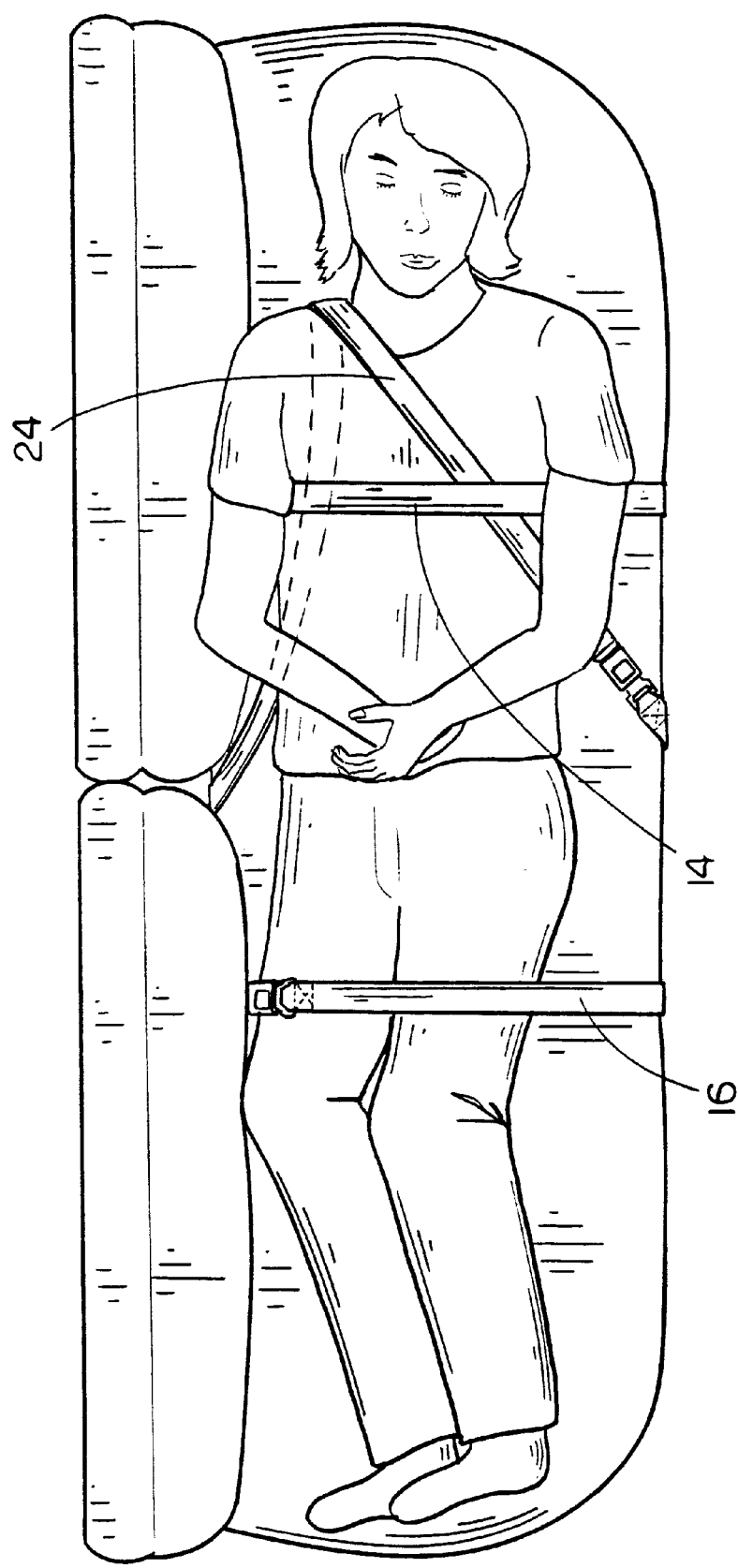
FIG. 4 is a top view of the safety restraint in use with the "Chena" style diagonal belt.

A preferred embodiment of the safety restraint is illustrated in the perspective view of FIG. 1. As seen in this view, there are three main components to the safety restraint 10 of the present invention; namely, a diagonal belt 12, a transverse first belt 14 and a transverse second belt 16. As shown in FIG. 4, diagonal belt 12 is looped over the shoulder of the passenger, first belt 14 is secured about the chest and under the arms of the passenger, and second belt 16 is secured about the thighs of the passenger. Each of these main components may be further separated into constituent components, as seen in the remaining figures.

Figure 6:
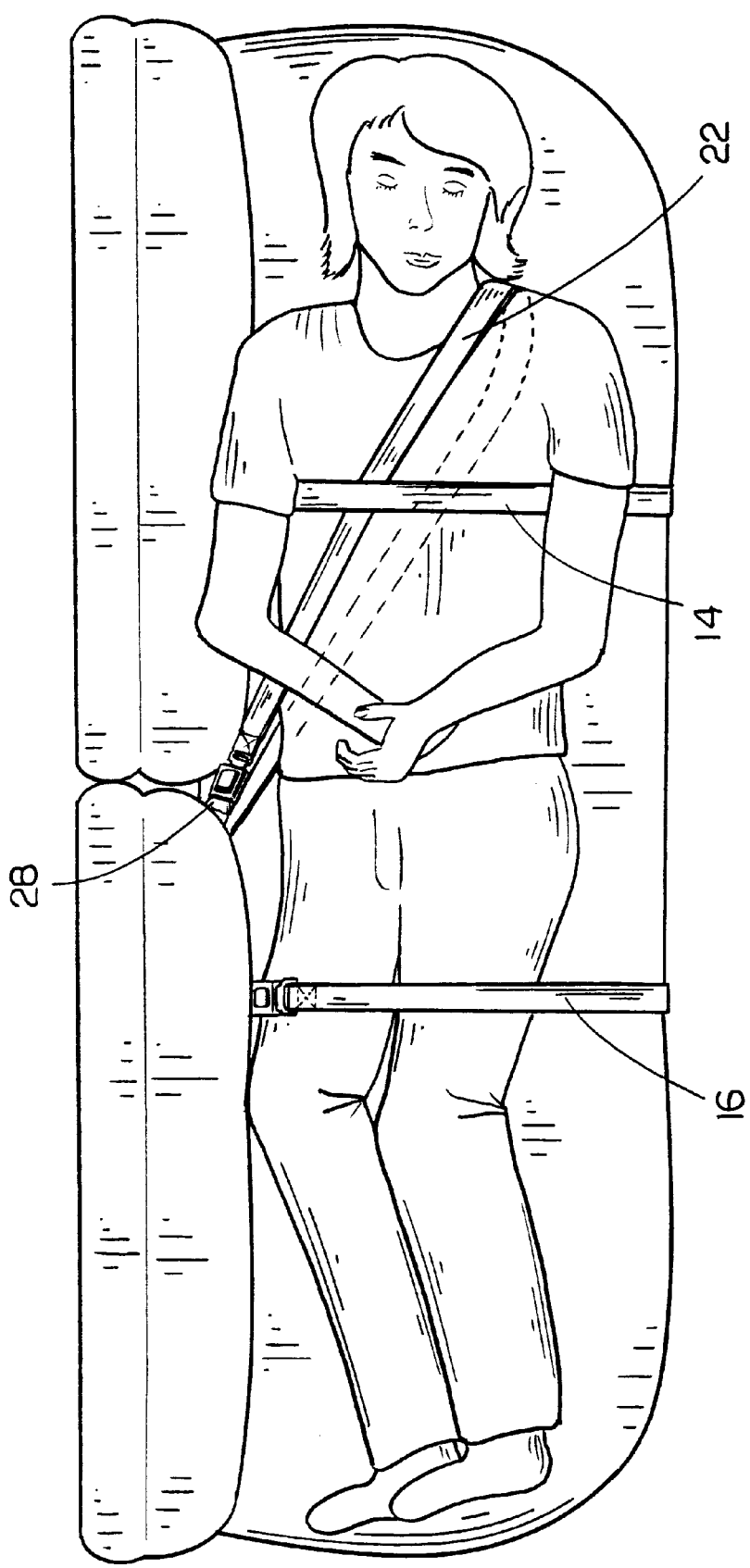
FIG. 6 is a top view of the safety restraint in use with a "Kuta" style diagonal belt.

Diagonal belt 12 may be anchored to the frame member 18 of the sleeping surface 20, to the frame of the vehicle, or to other components of the safety restraint 10 as described herein. Diagonal belt 12 may be configured generally in one of two ways. In one configuration, diagonal belt 12 may be secured proximal a side of the sleeping surface 20 near the hip of the passenger, extend over the upper surface of the sleeping surface 20, then over the shoulder of the horizontal passenger to be secured at a point near its origin. This configuration, shown in FIG. 6, is known as a "Kuta" belt 22. Alternatively, diagonal belt 12 may be anchored proximal a side of the sleeping surface 20 near the hip of the passenger, looped over the shoulder of the passenger and secured proximal the opposite side of the sleeping surface 20 transverse to its point of origin. This configuration, shown in FIG. 4, is known as a "Chena" belt.

Preferably, diagonal belt 12 is mounted in a fixed position and is comprised of an adjustable belt 26 which extends around the passenger, and a fixed belt 28 to which the adjustable belt 26 is connected by selectively releasable means 30. Selectively releasable means 30 preferably consists of two elements: buckle 32 and corresponding tab 34. It is to be understood that either element, buckle 32 or tab 34, may be mounted on the adjustable belt 26 with the other element mounted on the fixed belt 28. The combination of the buckle 32 and the corresponding tab 34 is well known in the art. Other means for joining belts, also well known in the art, may by used for the selectively releasable means 30.

Diagonal belt 12 must be of adjustable length to circumscribe passengers of different sizes. This may be accomplished by incorporating a selectively locking mechanism 36 with the adjustable belt 26. Such mechanisms are well known in the art for rolling and unrolling a belt during initial adjustment and retaining the belt at the adjusted length during impact. Alternatively, adjustable belt 26 may incorporate a conventional frictional buckle 38, the use of which is also well known in the art. Other means of providing a belt of adjustable length that are well known in the art may be incorporated by the adjustable belt 26.

Safety restraint 10 also includes the transverse first belt 14 and the transverse second belt 16. Like the diagonal belt 12, each of first and second belts 14 and 16 must be of adjustable length. This may be accomplished by any conventional means such as those previously described. The manner in which the first and second belts 14 and 16 are mounted within the vehicle depends on the environment in which the safety restraint 10 is used. If, as shown in FIG. 1, the sleeping surface 20 has an accessible underside, first belt 14 and second belt 16 may each be comprised of a single belt looped around the portion of the sleeping surface 20 on which the passenger is to lie. Each has first and second ends 40 and 42 which are joined together by selectively releasable means 30, as previously described.

Figure 13:
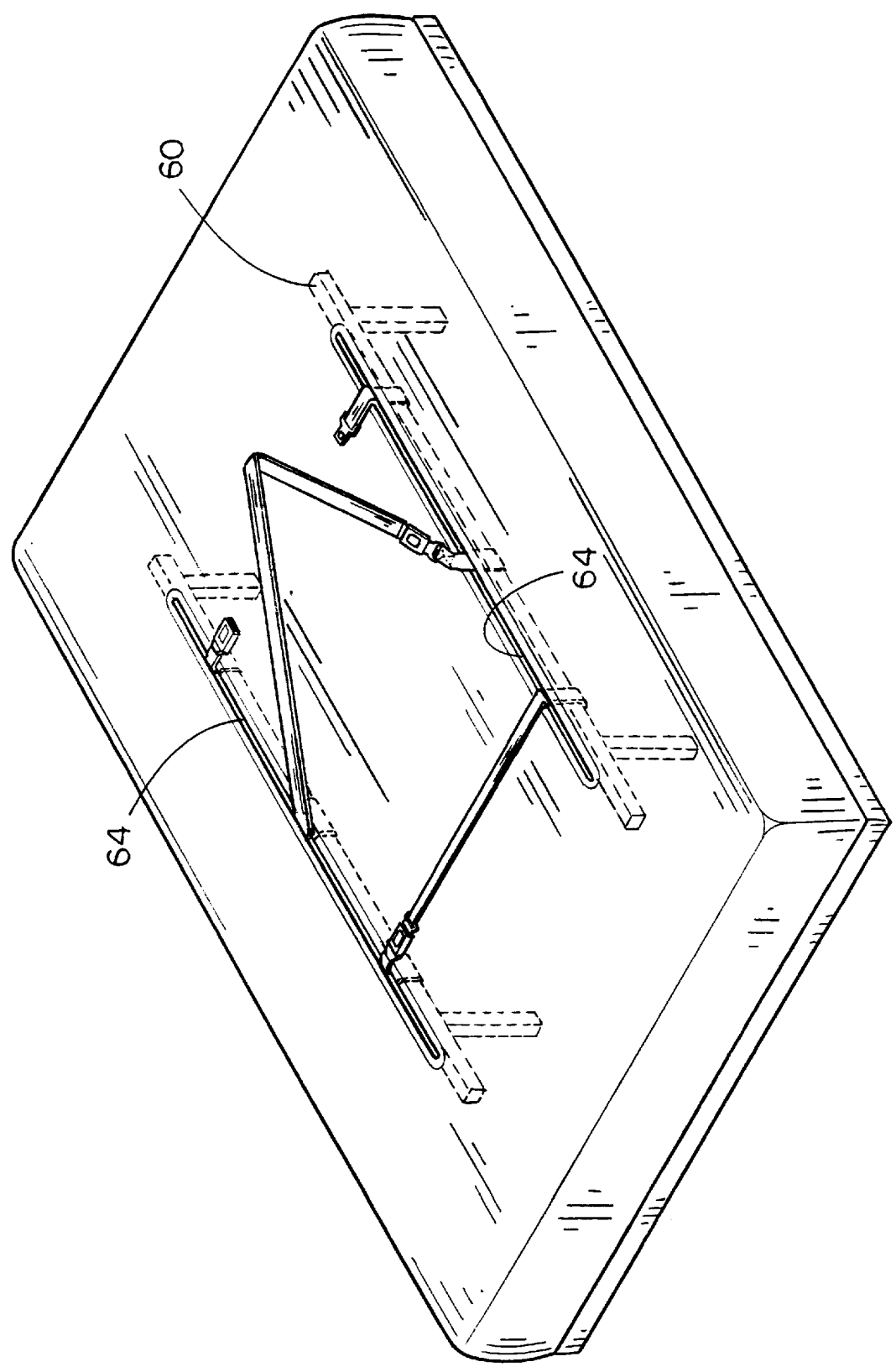
FIG. 13 is a perspective view of the safety restraint used in conjunction with a flat bed having rigid supports proximal both sides of the bed.

If, on the other hand, the sleeping surface has an underside which is inaccessible such as is shown in FIG. 13, first and second belts 14 and 16 must each include an adjustable belt 26, a fixed belt 28, and a selectively releasable means 30 for joining the adjustable and fixed belts 26 and 28. The arrangement of the adjustable belt 26, the fixed belt 28, and the selectively releasable means 30 may also be implemented if sleeping surface 20 has an accessible underside.

Figure 15:
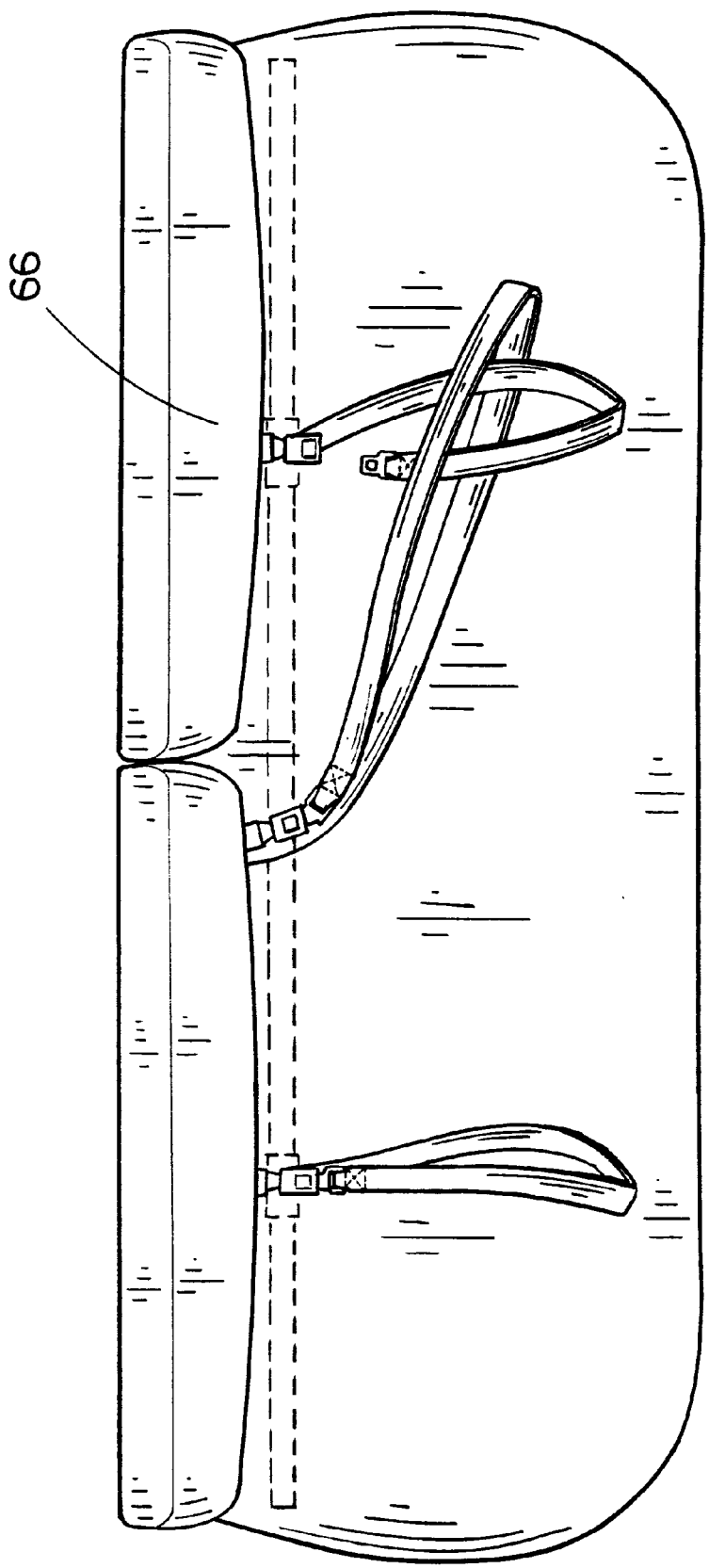
FIG. 15 is a top view of the safety restraint with first and second belts adapted to lie on the sleeping surface.

For each of the first and second belts 14 and 16, adjustable belt 26 and fixed belt 28 may be mounted in one of two ways. Adjustable belt 26 must be mounted proximal one side of the sleeping surface 20. Fixed belt 28 may be mounted proximal the opposite side of the sleeping surface 20 such that first or second belt 14 or 16 extends over the passenger. This configuration is shown in FIG. 13. Alternatively, fixed belt 28 may be mounted at the same location as the adjustable belt 26 such that first or second belt 14 or 16 extends between the passenger and the sleeping surface 20, then extends over the passenger and back to the point of its origin. This configuration is shown in FIG. 15. It is preferred that the configuration shown in FIG. 15 be employed only in an environment where the sleeping surface 20 is located in close proximity to an upright padded surface 66, such as a padded wall or the upright portion of a seat. Adjustable belt 26 and fixed belt 28 must be anchored proximal the side of the sleeping surface 20 adjacent the upright padded surface 66.

Figure 2:
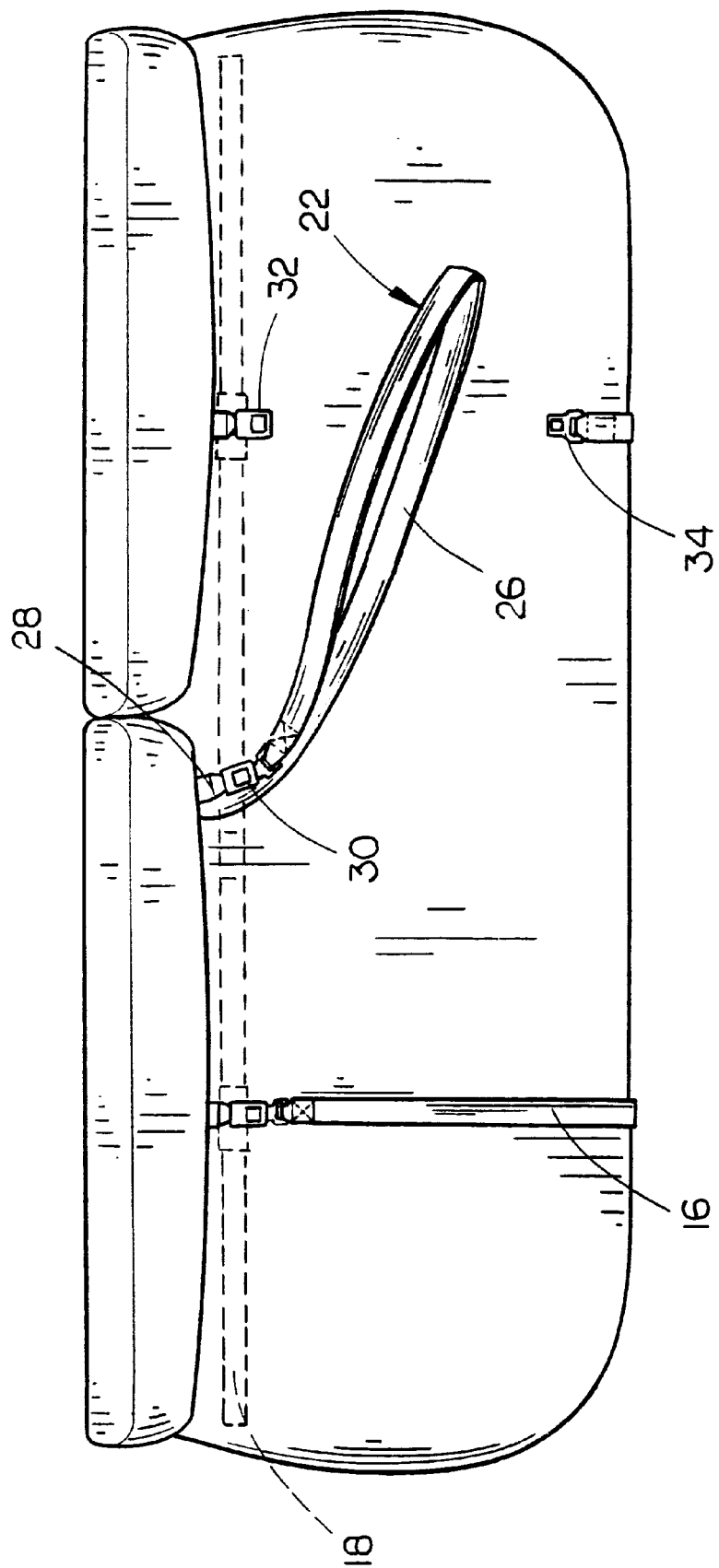
FIG. 2 is a top view of the safety restraint with a "Kutan" style diagonal belt.
Figure 3:
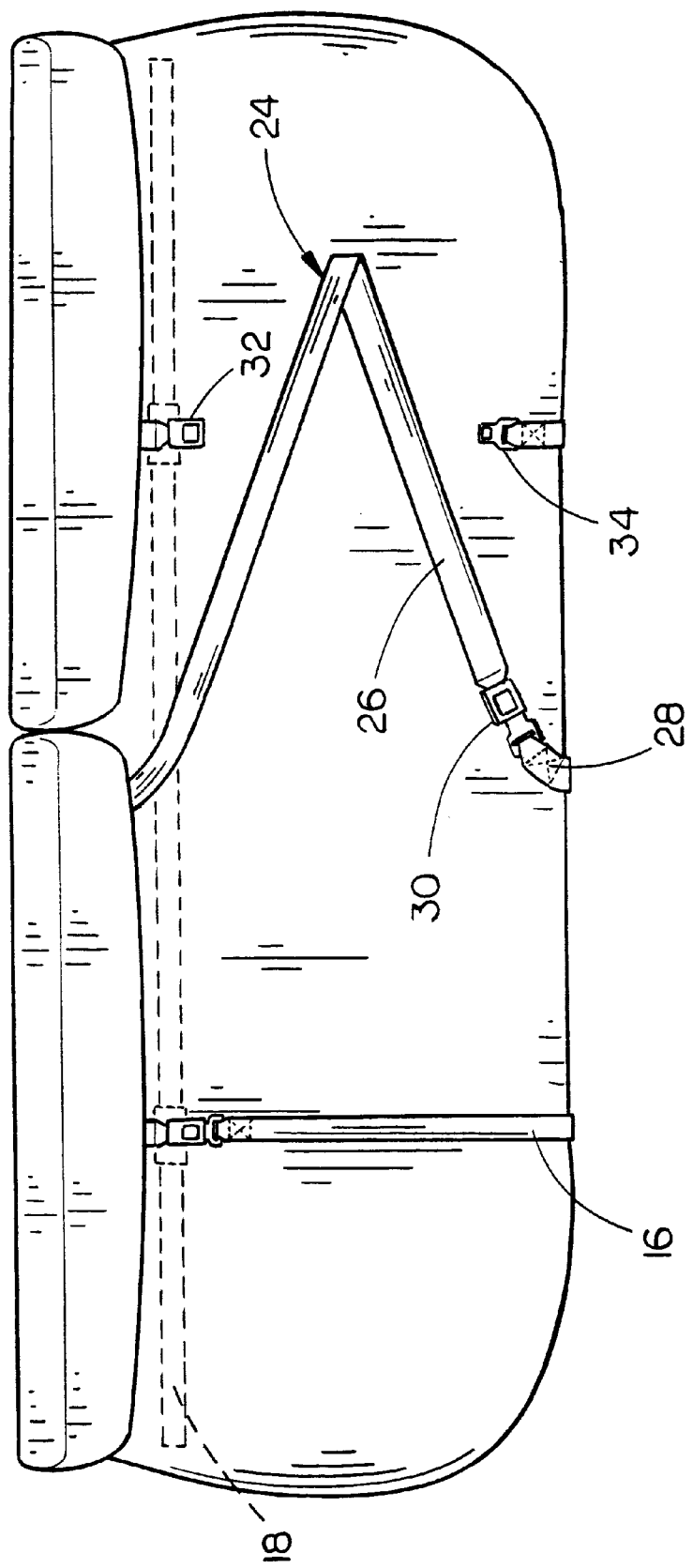
FIG. 3 is a top view of the safety restraint with a "Chena" style diagonal belt.

First and second belts 14 and 16 must be mounted such that they do not move lengthwise along the sleeping surface 20. This may be achieved in numerous ways As seen in FIG. 2, first and second belts 14 and 16 are rigidly affixed to a frame member 18 of the sleeping surface 20. As previously stated, first belt 14 is to be secured about the chest and under the arms of the passenger, and second belt 16 is to be secured about the thighs of the passenger. If the first and second belts 14 and 16 are in fixed positions along the length of sleeping surface 20, safety restraint 10 may only accommodate passengers within an acceptable range of height. For example, if a child were to use the safety restraint 10 as described, first belt 14 may be secured about the chest of the child, but second belt 16 may be secured about the child below the knees, providing inadequate restraint. It is therefore preferred that if rigidly affixed transverse belts are to be used, three or more transverse belts be provided and spaced apart lengthwise along the sleeping surface 20. The passenger may then implement the belts that properly secure him to the sleeping surface 20.

Figure 10:
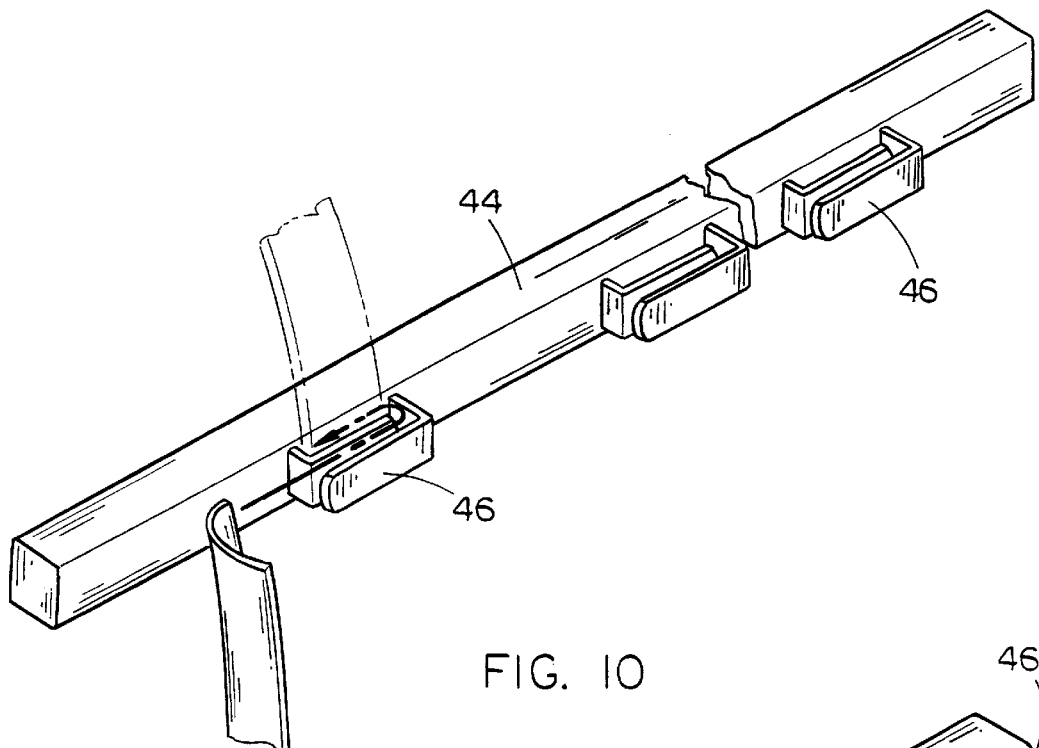
FIG. 10 is a perspective view of a belt and its relationship with an elongated member having a plurality of fixed brackets.

Preferably, first and second belts 14 and 16 may by adjusted longitudinally and then secured in position. This may be achieved by providing an elongated member 44 that is adapted to receive at least the first and second belts 14 and 16 in spaced-apart lengthwise relation. Elongated member 44 may include a plurality of spaced-apart overlapping tabs 46 adapted to receive a belt threaded therein as shown in FIG. 10. Elongated member 44 must be attached to the frame of the vehicle, a frame member 18 of the sleeping surface 20, or some other substantially stationary surface within the vehicle.

Figure 7:
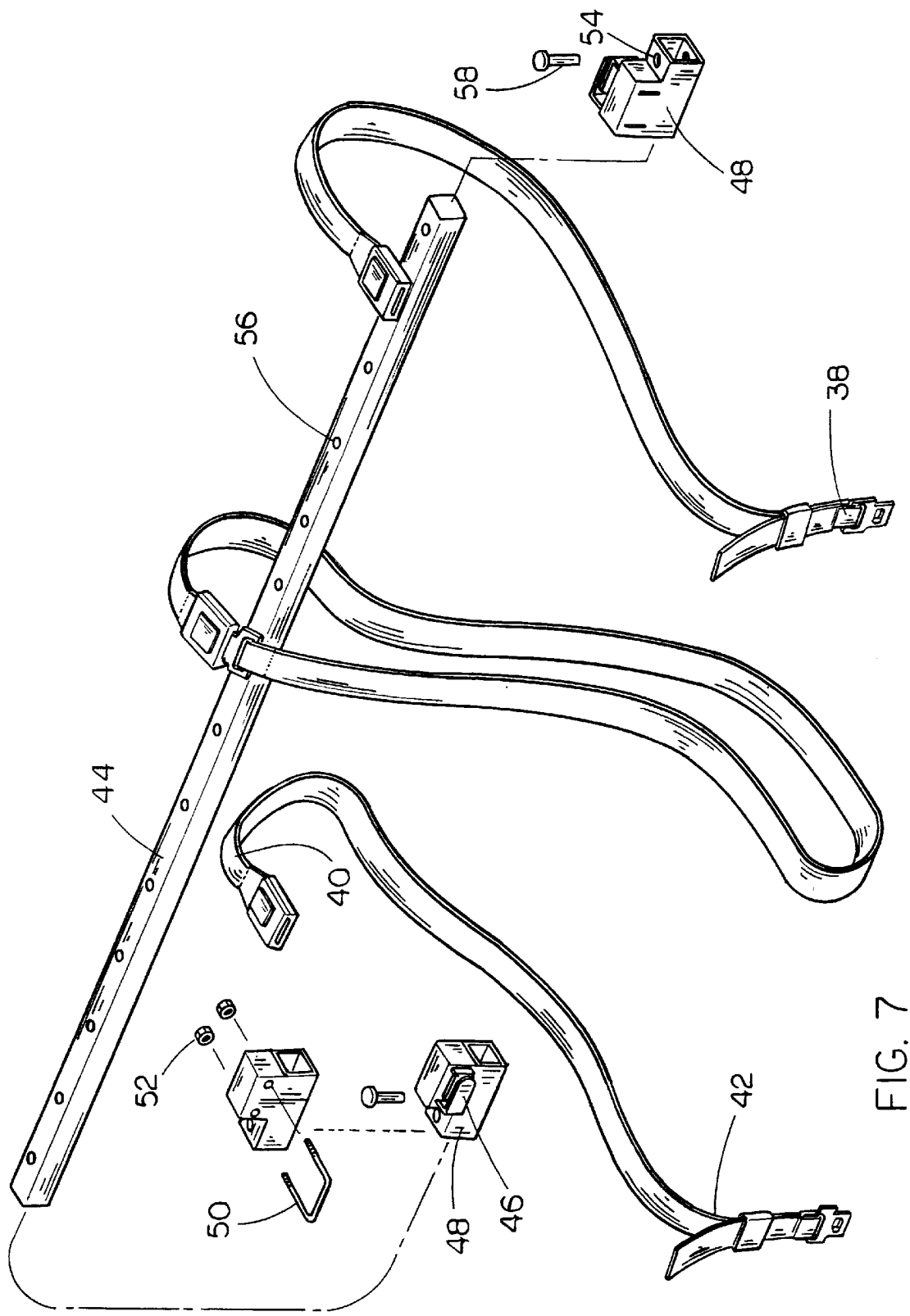
FIG. 7 is an exploded perspective view of an elongated member used in conjunction with the safety restraint and including a plurality of brackets.
Figure 8:
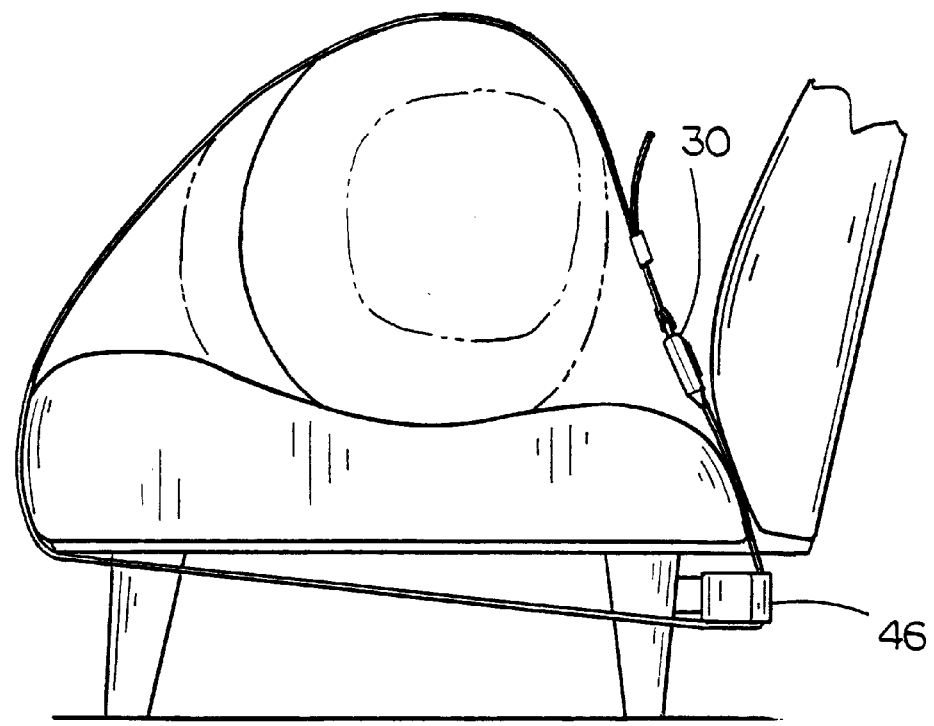
FIG. 8 is a right side elevational view of the safety restraint with first and second belts adapted to encircle the bench portion of a seat.
Figure 9:
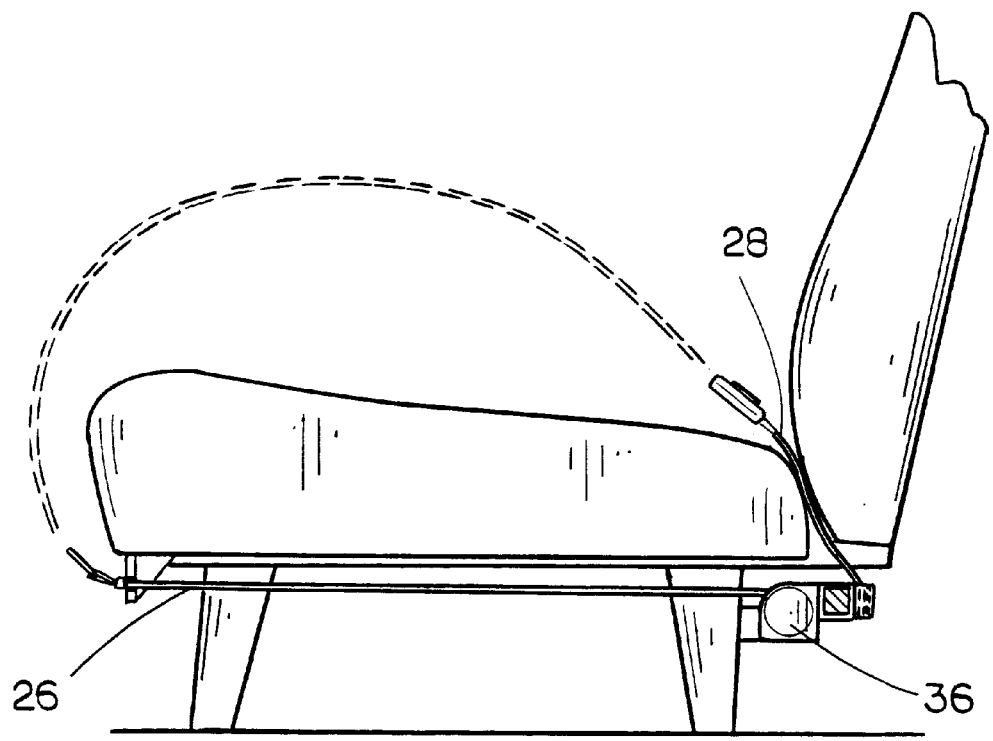
FIG. 9 is a right side elevational view of the safety restraint incorporating a selectively locking mechanism for rolling and unrolling a belt.
Figure 11:
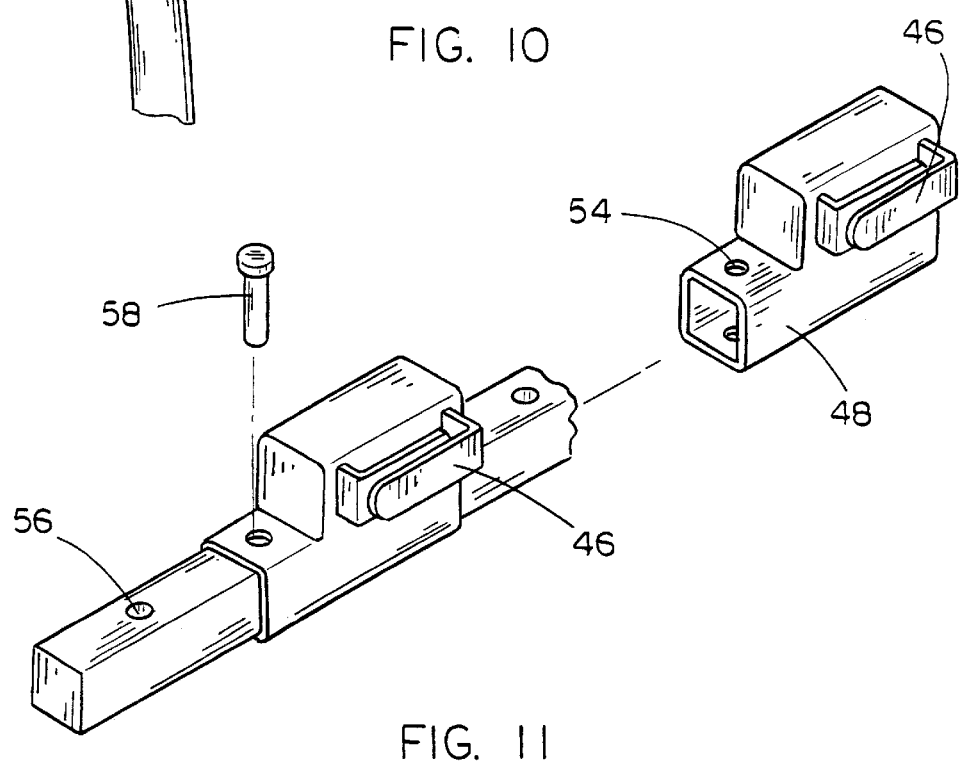
FIG. 11 is a perspective view of an elongated member adapted to received a plurality of moveable brackets.

Preferably, elongated member 44 is adapted to receive at least two adjustable brackets 48. As shown in FIG. 11, each adjustable bracket 48 must include mean for retaining a belt therein and means for securing the bracket to a position on the elongated member 44. Means for retaining the belt therein may include overlapping tabs 46, a U-shaped bolt 50 retained in place by at least one nut 52, or other means well known in the art. An example of a structure for securing the bracket to a position on the elongated member 44 is shown in FIGS. 7 and 11. This structure comprises hole 54 in the adjustable bracket 48, a series of corresponding holes 56 in the elongated member 44, and a retainer pin 58 adapted to fit through both the hole 54 and a corresponding hole 56, thereby preventing the lengthwise movement of the adjustable bracket 48 on the elongated member 44. Obviously, numerous other structures may be used to retain the adjustable bracket 48 in place.

As previously described, first and second belts 14 and 16 may each be comprised of an adjustable belt 26 and a fixed belt 28 adapted to extend over a passenger. For this configuration to be longitudinally adjustable, a second elongated member 60 must be mounted proximal the side of sleeping surface 20 opposite the elongated member 44. For each transverse belt, adjustable belt 26 must be mounted on either the elongated member 44 or the second elongated member 60. Fixed belt 28 must be mounted opposite the adjustable belt 26 on the other of the elongated member 44 or the second elongated member 60. Similarly, where first and second belts 14 and 16 are comprised of an adjustable belt 26 and a fixed belt 28 adapted to extend around a passenger and return the point of origin, both adjustable belt 26 and fixed belt 28 may be mounted on a single adjustable bracket 48.

If first and second belts 14 and 16 are each comprised of an adjustable belt 26 and a fixed belt 28, preferably each belt is permanently attached to an adjustable bracket 48 as previously described. Each belt, may, however, be mounted on the elongated member 44 or the second elongated member 60 by any means which would allow the user to place the belt in a position appropriate for his size and to secure the belt in that position.

The first and second belts 14 and 16 share many characteristics with the diagonal belt 12. Adjustable belt 26 and fixed belt 28 of each of the diagonal belt 12 and the first and second belts 14 and 16 are joined by a selectively releasable means 30 as previously described. The lengths of each of the diagonal belt 12 and the first and second belts 14 and 16 are variable by implementation of an adjustable belt 26 in the manner previously described. If the first and second belts 14 and 16 are comprised of a single belt having first and second ends 40 and 42 which are joined together by selectively releasable means 30, either of the first or second ends 40 or 42 may incorporate means for adjusting the length of the belt such as a frictional adjustable buckle 38.

Figure 12:
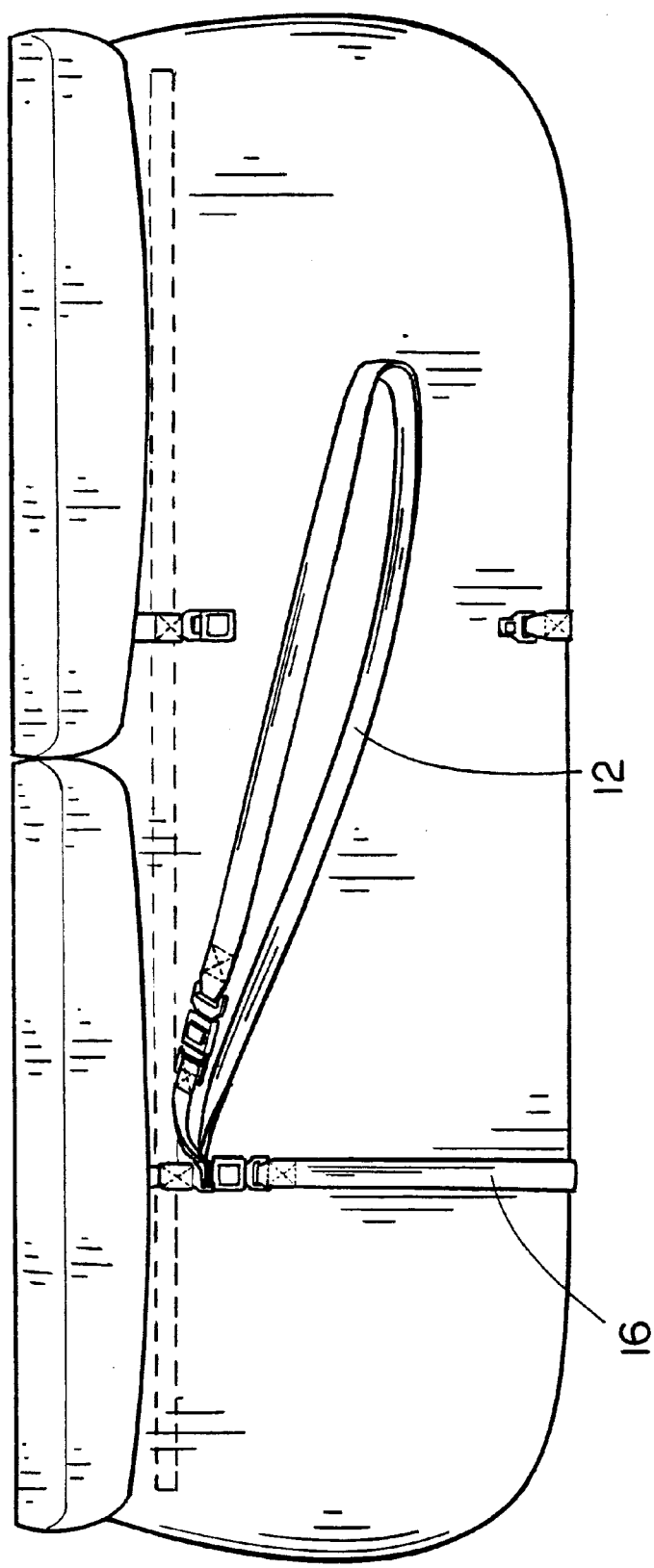
FIG. 12 is a top view of the safety restraint with an integral second an diagonal belt.

Diagonal belt 12 may also be longitudinally adjustable. This may be achieved by mounting an additional adjustable bracket 48 on the elongated member 44. Where a "Chena" belt is to be used, an additional adjustable bracket 48 must be provided on the second elongated member 60 and positioned opposite the point of origin of the diagonal belt 12. Alternatively, diagonal belt 12 may be secured to either of the first or second belts 14 or 16, or any of the adjustable brackets 48 supporting first or second belts 14 and 16. An example of this configuration is shown in FIG. 12 with a "Kuta" belt 22 attached to a fixed belt 28 of the second belt 16. If the diagonal belt 12 is to be mounted on either of the first or second belts 14 and 16, it is preferred that the diagonal belt 12 be mounted on the second belt 16 to position the diagonal belt 12 at an angle that is comparatively acute to the longitudinal axis of the passenger.

Figure 14:
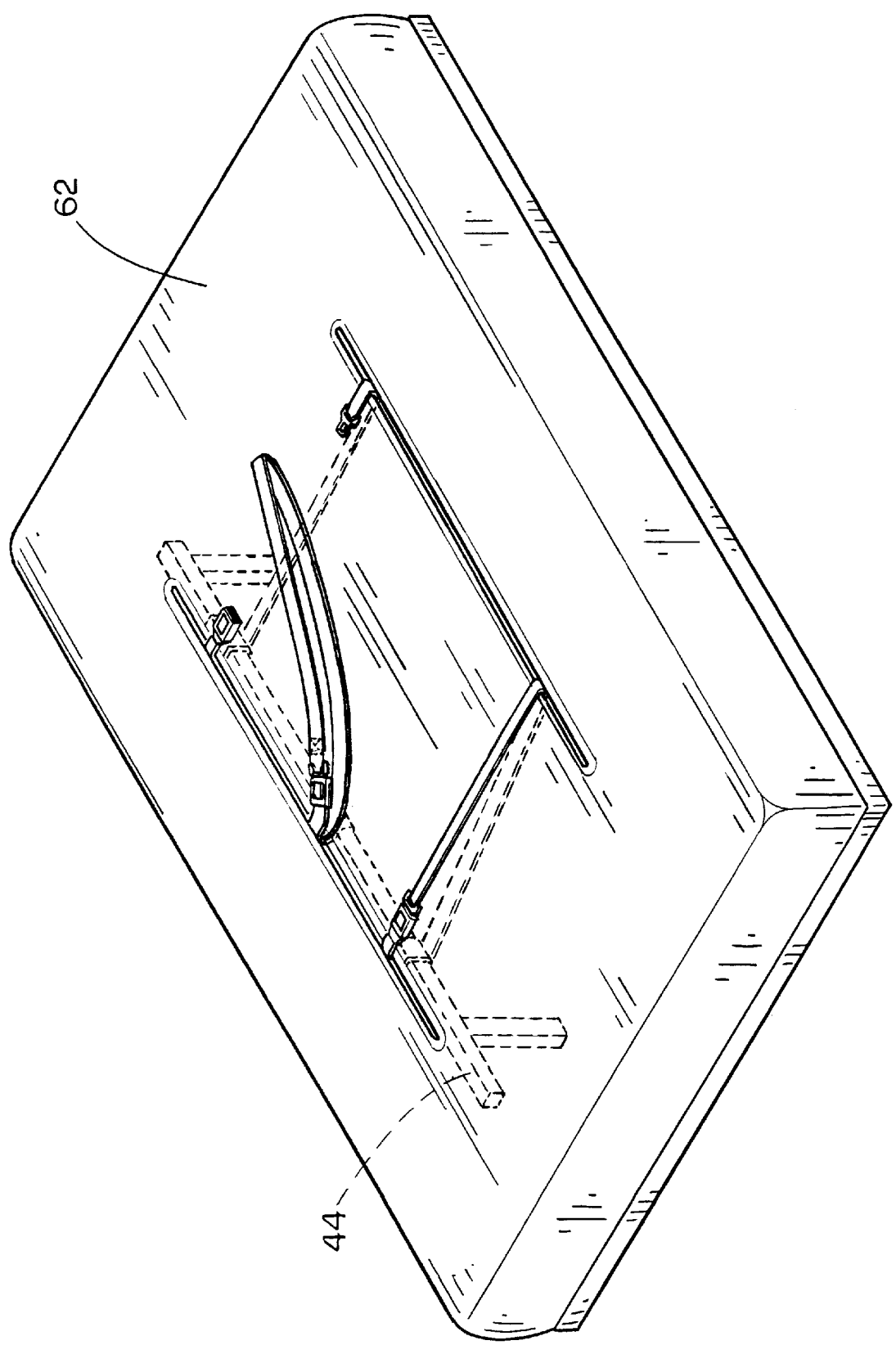
FIG. 14 is a perspective view of the safety restraint used in conjunction with a flat bed having a single rigid support.

Safety restraint 10 may be used in an environment where the sleeping surface 20 comprises a bed 62 as shown in FIGS. 13 and 14. Bed 62 must include channels 64 through which the safety restraint 10 extends. The different configurations of the safety restraint 10 previously described may be implemented in this environment. Each or any of the diagonal belts 12 and the first and second belts 14 and 16 may be longitudinally adjustable or fixed. Diagonal belt 12 may be a "Kuta" belt 22 or a "Chena" belt 24. First and second belts 14 and 16 may be comprised of a single belt having first and second ends 40 and 42, or of an adjustable belt 26 and a fixed belt 28. It should be noted that the channels 64 should be parallel and spaced apart a distance that approximates the width of the passenger. This structure will allow the first belt 14 to be worn comfortably under the arms of the passenger and will restrict the movement of the passenger in the event of the application of sudden force.

In use, diagonal belt 12 is secured around the shoulder of the passenger, first belt 14 is secured around the chest and under the arms of the passenger, and second belt 16 is secured around the thighs of the passenger. Diagonal belt 12 prevents the movement of the passenger across the sleeping surface 20 in a direction toward his head by restraining his shoulder. First and second belts 14 and 16 prevent the movement of the passenger across the sleeping surface 20 in a direction transverse to the longitudinal axis of the body of the passenger by restraining the chest and thighs, respectively. Where the configuration shown in FIG. 15 is used, first and second belts 14 and 16 prevent the movement of the passenger only in a direction away from the upright padded surface 66. First belt 14 prevents the movement of the passenger in a direction across the sleeping surface 20 in a direction toward his feet by applying pressure to the underarms of the passenger. In the event a force is applied from a different angle, a combination of all the belts will protect the passenger.

Figure 5:
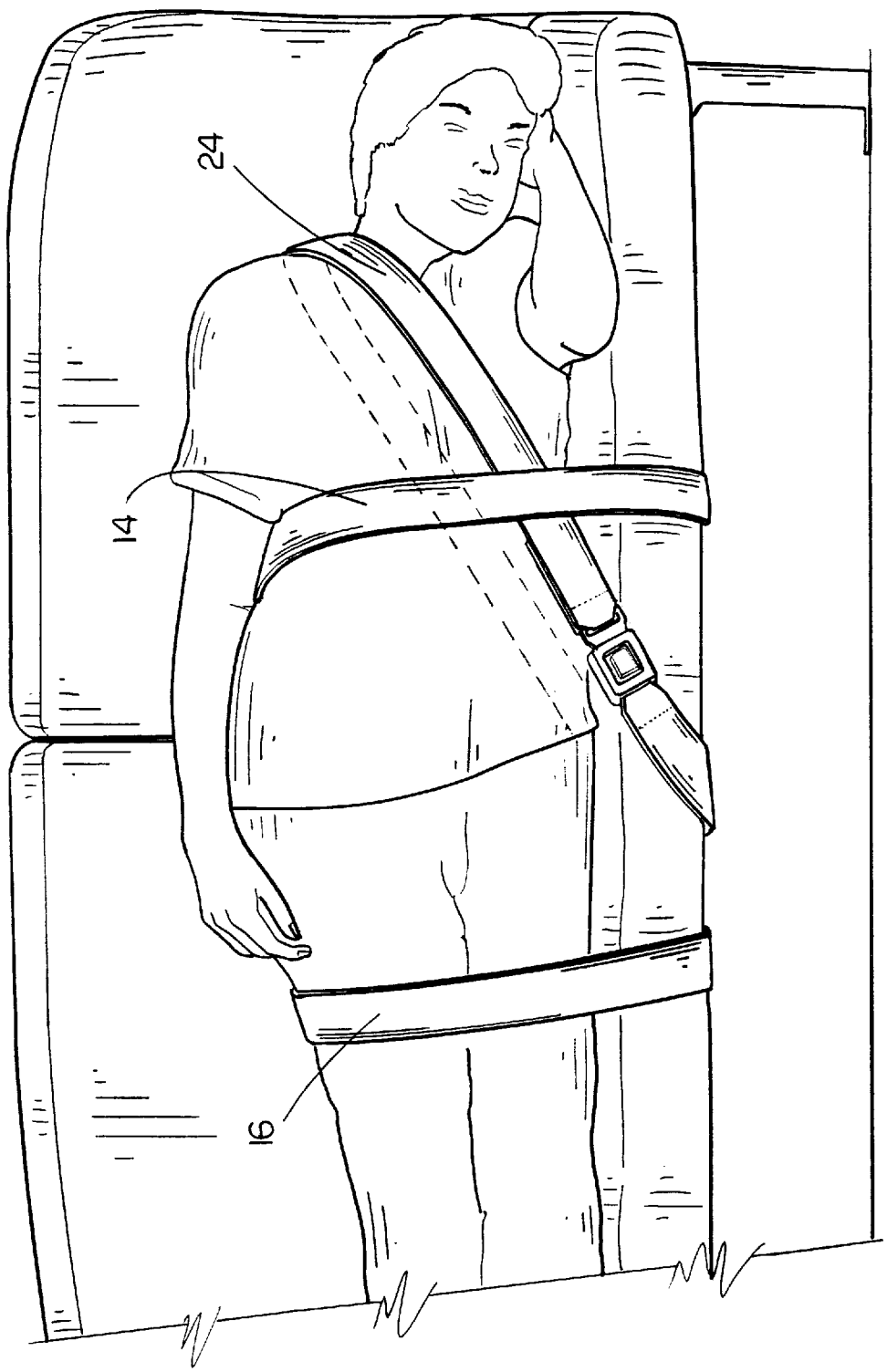
FIG. 5 is a front elevational view of the same with the passenger lying on her side.

As shown in FIGS. 4, 5, and 6, diagonal belt 12 and first belt 14 substantially encircle a shoulder of the passenger. This configuration serves two purposes. As previously described, the combination of the diagonal belt 12, the first belt 14, and the second belt 16 protect the passenger despite the application of sudden force, which, for example, would be experienced in the event of a collision. The passenger is protected from collisions that occur from any direction. Furthermore, the passenger is protected because the belts restrain the passenger by applying force to parts of the body that are less susceptible to damage, for example, the shoulder, chest, and thighs, than other parts of the body, for example, the neck and abdomen. Damage to the body may be further minimized by implementation of wide belts, which would lower the force per unit area applied to the portion of the body in contact with the belts.

This configuration also serves the purpose of maintaining the position of the diagonal belt 12 and the first belt 14 in a constant position relative to the passenger's body. Many people are inclined to move in their sleep. Prior art restraints that employ only transverse belts cannot prevent a passenger from moving longitudinally such that the belts may be placed against a vulnerable part of the body, such as the neck, or from moving out of the restraint completely. The structure of the present invention prevents this occurrence.

Safety restraint 10 is also beneficial in that it is comfortable for the passenger. Although longitudinal movement is restricted, the belts allow the passenger to roll from his back to his side, his side to his chest, or such similar movements. It is preferred that the belts be made of material that is thin and flexible so a passenger can lie on a belt with no discomfort.

Thus it can be seen that the invention accomplishes at least all of the stated objectives.

I claim:

1. In combination:
    a vehicle having a sleeping surface with an upper surface and a length along which a passenger may lie in a horizontal position;
    a safety restraint for the horizontal passenger; said safety restraint comprising:
        a first belt having first and second ends, said first belt being operatively secured to the vehicle and positioned transverse to the length of the sleeping surface and having means for adjusting the length thereof;
        a second belt having first and second ends, said second belt being operatively secured to the vehicle and located distally from the first belt along the length of the sleeping surface, said second belt positioned transverse to the length of the sleeping surface and having means for adjusting the length thereof; and
        a third belt having first and second ends, said third belt being operatively secured to the vehicle having means for adjusting the length thereof and positioned diagonally in relation to the length of the sleeping surface and also positioned on the upper surface of the sleeping surface;
        said first belt being adapted to be secured over the chest of the passenger;
        said second belt being adapted to be secured over the thighs of the passenger; said third belt being adapted to be secured over the shoulder of the passenger;
        said sleeping surface including a side edge thereof and said third belt being mounted on the vehicle proximal the side edge of the sleeping surface and for positioning proximal the hips of the passenger at said first end thereof, further comprising a third latching means mounted on a second end of said third belt, and a third receiving means mounted on the vehicle for positioning proximal the hips of the passenger, said third latching means being releasably attachable to said third receiving means.

2. The safety restraint of claim 1 wherein said third receiving means is mounted on the vehicle proximal said second end of said third belt.

3. The safety restraint of claim 1 wherein the sleeping surface includes an opposite side edge and said third receiving means is mounted on the vehicle proximal the opposite edge and transverse said second end of said third belt.

4. The safety restraint of claim 1 wherein the sleeping surface has an accessible underside further comprising a first latching means mounted on a first end of said first belt, a first receiving means mounted on a second end of said first belt, a second latching means mounted on a first end of said second belt, and a second receiving means mounted on a second end of said second belt, said first latching means being releasably attachable to said first receiving means, said second latching means being releasably attachable to said second receiving means, said first and second belts adapted to encircle the sleeping surface.

5. The safety restraint of claim 4 wherein the vehicle includes a plurality of fixed brackets positioned along the length of the sleeping surface proximal the side edge thereof, each of said first and second belts being positioned in one of said brackets.

6. The safety restraint of claim 5 wherein the plurality of fixed brackets are mounted on an elongated member, the elongated member being mounted on the vehicle.

7. The safety restraint of claim 4 wherein the vehicle includes an elongated member mounted proximal the sleeping surface and parallel to the length of the sleeping surface, further comprising first and second brackets adjustably mounted on the elongated member and adapted to retain a belt thereon, each of said first and second brackets having securing means for selectively fixing said bracket to a desired position on the elongated member.

8. The safety restraint of claim 1 wherein the sleeping surface has a side edge and an opposite side edge, wherein said first and second belts are mounted on vehicle at first ends thereof proximal the side edge, further comprising a first latching means mounted on a second end of said first belt, first receiving means mounted on the vehicle proximal the opposite side edge and transverse said first end of said first belt, a second latching means mounted on a second end of said second belt, and second receiving means mounted on the vehicle proximal the opposite side edge and transverse said first end of said second belt, said first latching means being releasably attachable to said first receiving means, said second latching means being releasably attachable to said second receiving means.

9. The safety restraint of claim 8 wherein the vehicle includes a first elongated member parallel to the length of the sleeping surface and mounted proximal the side edge and a second elongated member parallel to the length of the sleeping surface and mounted proximal the opposite side edge further comprising first and second brackets adjustably mounted on the first elongated member, said first end of said first belt being mounted on said first bracket, said first end of said second belt being mounted on said second bracket, a nd first and second opposing brackets adjustably mounted on said second elongated member, said first receiving means being mounted on said first opposing bracket, said second receiving means being mounted on said second opposing bracket, each of said first and second brackets having securing means for selectively fixing said bracket to a desired position on the first elongated member and each of said first and second opposing brackets having securing means for selectively fixing said opposing bracket to a desired position on the second elongated member.

10. The safety restraint of claim 9 further comprising a third bracket adjustably mounted on the first elongated member between said first and second brackets, said third bracket having securing means for fixing said third bracket on said first elongated member at a desired position, said third belt being mounted on said third bracket.

11. The safety restraint of claim 9 wherein said third belt is mounted on said second belt.

12. The safety restraint of claim 9 wherein said third belt is mounted on said second bracket.

13. The safety restraint of claim 1 wherein the sleeping surface has a side edge an wherein said first and second belts are mounted on the vehicle at first ends thereof proximal the side edge, further comprising a first latching means mounted on a second end of said first belt, a first receiving means mounted on the vehicle proximal the side edge and said first end of said first belt, a second latching means mounted on a second end of said first belt, a second receiving means mounted on the vehicle proximal the side edge and said first end of said second belt, said first latching means being releasably attachable to said first receiving means, said second latching means being releasably attachable to said second receiving means.

14. The safety restraint of claim 13 wherein the vehicle includes an elongated member parallel to the length of the sleeping surface and mounted proximal said side edge, further comprising first and second brackets adjustably mounted on the first elongated member, said first end of said first belt and said first receiving means being mounted on said first bracket, said first end of said second belt and said second receiving means being mounted on said second bracket, each of said first and second brackets having securing means for selectively fixing said bracket to a desired position on the elongated member.

15. The safety restraint of claim 14 further comprising a third bracket adjustably mounted on the elongated member between said first and second brackets, said third bracket having securing means for fixing said third bracket on the elongated member at a desired position, said third belt being mounted on said third bracket.

16. The safety restraint of claim 14 wherein said third belt is mounted on said second belt.

17. The safety restraint of claim 14 where in s aid third belt is mounted on said second bracket.

* * * * *